May 19, 1953  H. WEHRENFENNIG ET AL  2,639,100

CAMERA WINDING KEY

Filed April 17, 1951

INVENTOR.
Hugo Wehrenfennig
Ludwig Delitz
BY Benj. T. Rauber
his attorney

Patented May 19, 1953

2,639,100

UNITED STATES PATENT OFFICE 2,639,100

CAMERA WINDING KEY

Hugo Wehrenfennig and Ludwig Leitz, Wetzlar (Lahn), Germany, assignors to Ernst Leitz G. m. b. H., Wetzlar (Lahn), Germany, a corporation of Germany Application April 17, 1951, Serial No. 221,361 In Germany July 10, 1950

6 Claims. (Cl. 242—71)

Our invention relates to apparatus for winding a film by hand onto a rotatable spool in a camera. Commonly cameras, especially small picture cameras, are provided with a device mounted at the upper wall of the housing for winding or rewinding the film on a spool located in a spool chamber after the final exposure of the film. The spool mounted in the spool chamber is accordingly so arranged that the spool flange or rim is located at the side lying next to the re-spooling device. The coupling between the re-spooling device and the spool is established through a catch extending through the interior of the core of the spool.

The customary closed form coupling heretofore used between the re-spooling device and the spool comprised the arrangement of corresponding coupling elements on the re-spooling device and the spool. Accordingly not only was the manufacture of the spools made more expensive, but also a general adaptability of the spools of various source was dependent upon the presence of a corresponding coupling link in the camera.

Through the arrangement of the re-spooling device on the upper side of the camera, the space required there for the housing of the range finder and the locator device and, in a given case also for the exposure meter, was undesirably hindered.

To obviate these disadvantages, in accordance with our invention, the re-spooling device is provided with a gripping device equipped with a control grip frictionally enveloping the circumference of the flange or rim of the spool. This re-spooling device is independent of the inner construction of the spool, since the spool flange is standardized universally as to its measurements, and the frictionally engaging gripping device also permits deviations therefrom to be bridged.

Preferably the gripping device is provided on the removable bottom cover of the camera shell whereby it is arranged thereon with advantage co-axially with the locking device for the bottom cover.

An especially effective embodiment of the invention comprises at least two clutches pivoted on the control grip eccentrically to the spool axis to embrace the circumference of the spool flange or rim with the arms of the clutch in frictional engagement with a stationary support. Preferably this support for the clutch arms is combined with the locking device for the bottom cover. The handles for the locking and gripping devices are in known manner capable of being retracted into the cover whereby the handle for the gripping device is advantageously, in an equally well known manner, formed of a bail which may be swung in to a recess.

The invention is illustrated by way of example in the accompanying drawings, in which Fig. 1 is a section of a re-spooling device combined with a locking device for the bottom cover of a camera;

Figure 1:
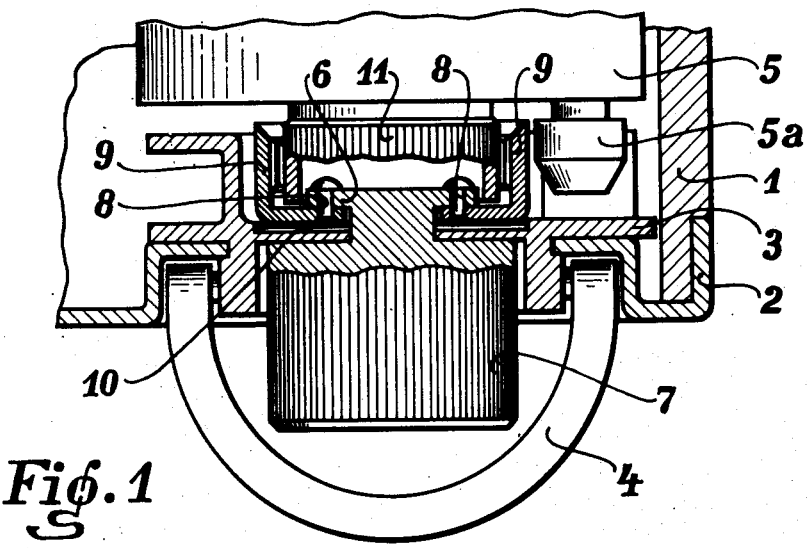
Figure 2:
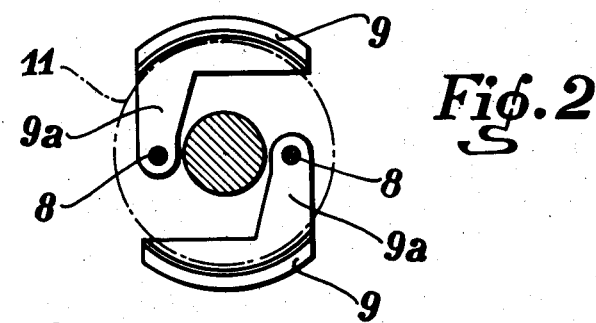
Fig. 2 is a face view of the gripping clutches.
Figure 3:
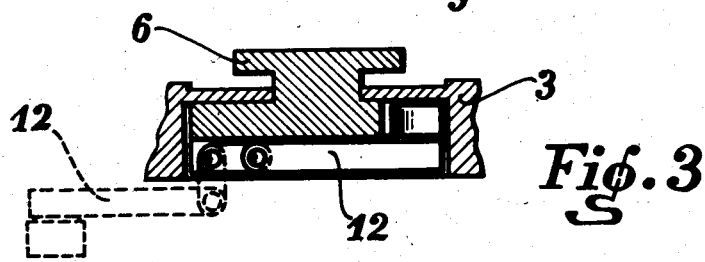
Fig. 3 is a section of a modification of the invention having a gripping device with a crank which may be retired to a recess when not in use.

In the embodiment of the invention illustrated in the accompanying drawings the camera housing 1 is provided in known manner with a removable bottom cover 2. The locking between the camera housing 1 and bottom cover 2 is accomplished in known manner by means of a locking device 3 whose handle 4 is sinkable into the bottom cover 2. The locking device 3 is placed coaxial with the spool of the change spool chamber 5. A cam $5^a$ located on the spool chamber 5 serves to open and close the spool chamber in the camera. The locking device carries in coaxial relation to the spool axis a rotatably mounted flange 6. The flange 6 is provided with a handle 7. Pivotally mounted on the flange on trunnions 8, eccentric to the spool axis, are gripping clutches 9 whose arms $9^a$ rub on a friction plate 10, mounted on the locking device 3. The gripping clutches 9 embrace the circumference of the spool flange or rim 11 and flare out conically in order to facilitate the introduction of the spool flange 11. Since the spool flange 11 is provided with a milled edge the gripping clutches 9 are preferably also provided with a complementary milled surface in order to accomplish a good engagement. Instead of the handle knob 7 provided in the embodiment of Fig. 1 for the re-spooling device, the flange 6 may be provided with a recessible crank 12 as shown in Fig. 3.

The mode of operation of the gripping device is as follows:

Upon mounting the bottom cover 2 on a camera provided with a spool chamber and spool, the clutches 9 are slipped over the spool flange or rim 11. Upon turning the handle 7 or 12 in re-spooling direction the stationary friction plate 10 causes a tong-like closing of the clutches 9 until they lie fast on the spool flange 11 and force it into turning movement with the handle. An insignificant turning movement of the handle 7 or 12 in the opposite direction causes a separation of the clutches 9 and with it a release of the spool rim 11.

Having described our invention, what we claim is:

1. A roll film camera housing enclosing a change spool mounting and comprising a removable base cover for the camera housing and a rotatable clutch mounted thereon and having gripping elements positioned to engage the rim of a spool in said housing.

2. The roll film camera housing of claim 1 having a locking element for the base cover coaxial with the axis of rotation of said clutch.

3. The roll film camera housing of claim 2 in which the clutch comprises a fixed friction element and at least two clutches pivoted eccentrically to the spool axis in position to engage the spool rim and having arms in frictional contact with said friciton element.

4. The roll film camera housing of claim 3 in which the friction element is mounted on the locking element.

5. The roll film camera housing of claim 3 in which said locking device has a handle retractable into the locking element.

6. The roll film camera housing of claim 3 in which said clutch is provided with a crank pivoted to fold into said base cover.

HUGO WEHRENFENNIG.
LUDWIG LEITZ.

References Cited in the file of this patent

UNITED STATES PATENTS

| Number | Name | Date |
|---|---|---|
| 1,169,882 | Speidel | Feb. 1, 1916 |
| 1,691,414 | Thornton | Nov. 13, 1928 |
| 1,721,734 | Holman | July 23, 1929 |
| 2,027,332 | Crumrine | Jan. 7, 1936 |
| 2,245,214 | Mihalyi | June 10, 1941 |